(12) United States Patent
Inoue et al.

(10) Patent No.: US 8,993,156 B2
(45) Date of Patent: Mar. 31, 2015

(54) CARBON-BASED NEGATIVE ELECTRODE MATERIAL AND SECONDARY BATTERY INCLUDING NEGATIVE ELECTRODE MATERIAL

(75) Inventors: Nobuhiro Inoue, Kanagawa (JP); Junpei Momo, Kanagawa (JP); Hiroatsu Todoriki, Kanagawa (JP); Teppei Oguni, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/586,952

(22) Filed: Aug. 16, 2012

(65) Prior Publication Data
US 2013/0052522 A1     Feb. 28, 2013

(30) Foreign Application Priority Data

Aug. 31, 2011  (JP) ................................. 2011-188920

(51) Int. Cl.
| | |
|---|---|
| *H01M 6/14* | (2006.01) |
| *H01M 4/587* | (2010.01) |
| *H01M 10/0525* | (2010.01) |
| *H01M 10/0569* | (2010.01) |
| *B82Y 30/00* | (2011.01) |
| *H01M 4/02* | (2006.01) |

(52) U.S. Cl.
CPC .......... *H01M 4/587* (2013.01); *H01M 10/0525* (2013.01); *H01M 10/0569* (2013.01); *B82Y 30/00* (2013.01); *H01M 2004/021* (2013.01); *Y02E 60/122* (2013.01); *Y02T 10/7011* (2013.01)
USPC ........................................................ 429/188

(58) Field of Classification Search
None
See application file for complete search history.

(56) References Cited

U.S. PATENT DOCUMENTS

| | | | |
|---|---|---|---|
| 6,465,134 B1 * | 10/2002 | Shibuya et al. ............... | 429/300 |
| 7,071,258 B1 * | 7/2006 | Jang et al. ..................... | 524/496 |
| 7,179,561 B2 | 2/2007 | Niu et al. | |
| 7,745,047 B2 | 6/2010 | Zhamu et al. | |
| 7,842,432 B2 | 11/2010 | Niu et al. | |

(Continued)

FOREIGN PATENT DOCUMENTS

| | | |
|---|---|---|
| JP | 11-120992 | 4/1999 |
| JP | 2006-265751 | 10/2006 |

(Continued)

OTHER PUBLICATIONS

Singh et al., Graphene based materials: Past, present and future, Progress in Materials Science 56 (2011) 1178-1271, Available online Apr. 3, 2011.*

(Continued)

*Primary Examiner* — Patrick Ryan
*Assistant Examiner* — Jose Colucci Rios
(74) *Attorney, Agent, or Firm* — Nixon Peabody LLP; Jeffrey L. Costellia (57) ABSTRACT

To provide a carbon-based negative electrode material which can be used with an electrolyte containing PC as a main ingredient, a carbon-based negative electrode material having a graphene layer structure is crystalline and has pores. That is, the crystal structure of the carbon-based negative electrode material is distorted more significantly than that of graphite. Accordingly, the carbon-based negative electrode material has a larger interlayer distance between graphenes than graphite. It has been shown that such a negative electrode material can be used for a secondary battery which contains an electrolyte containing PC as a main ingredient.

11 Claims, 10 Drawing Sheets

(56) References Cited

U.S. PATENT DOCUMENTS

| | | |
|---|---|---|
| 7,939,218 B2 | 5/2011 | Niu |
| 7,977,007 B2 | 7/2011 | Niu et al. |
| 7,977,013 B2 | 7/2011 | Niu et al. |
| 8,278,011 B2 | 10/2012 | Zhu et al. |
| 2008/0254296 A1 | 10/2008 | Handa et al. |
| 2009/0117467 A1* | 5/2009 | Zhamu et al. .............. 429/231.8 |
| 2010/0021819 A1* | 1/2010 | Zhamu et al. .............. 429/231.8 |
| 2010/0143798 A1 | 6/2010 | Zhamu et al. |
| 2010/0176337 A1 | 7/2010 | Zhamu et al. |
| 2010/0248034 A1 | 9/2010 | Oki et al. |
| 2010/0330421 A1 | 12/2010 | Cui et al. |
| 2011/0012067 A1 | 1/2011 | Kay |
| 2011/0111303 A1 | 5/2011 | Kung et al. |
| 2011/0121240 A1 | 5/2011 | Amine et al. |
| 2011/0159372 A1 | 6/2011 | Zhamu et al. |
| 2011/0216876 A1 | 9/2011 | Amano et al. |
| 2011/0229795 A1 | 9/2011 | Niu et al. |
| 2012/0045692 A1 | 2/2012 | Takemura et al. |
| 2012/0088151 A1 | 4/2012 | Yamazaki et al. |
| 2012/0141866 A1 | 6/2012 | Kuriki et al. |
| 2013/0052526 A1 | 2/2013 | Momo et al. |

FOREIGN PATENT DOCUMENTS

| | | |
|---|---|---|
| JP | 2007-053022 | 3/2007 |
| JP | 2009-524567 | 7/2009 |
| JP | 2009-176721 | 8/2009 |
| JP | 2011-503804 | 1/2011 |
| JP | 2011-517053 | 5/2011 |
| WO | WO-2006/062947 A2 | 6/2006 |
| WO | WO-2007/061945 A2 | 5/2007 |
| WO | WO-2009/061685 A1 | 5/2009 |
| WO | WO-2009/127901 A1 | 10/2009 |
| WO | WO-2009/144600 A1 | 12/2009 |

OTHER PUBLICATIONS

Zhou.X et al., "Graphene modified LiFePO4 cathode materials for high power lithium ion batteries,", J. Mater. Chem. (Journal of Materials Chemistry), 2011, vol. 21, pp. 3353-3358.

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

Ogumi.Z et al., "Chapter 3 Carbon Anode Materials", Lithium-Ion Batteries Science and Technologies, 2009, pp. 49-73, Springer.

* cited by examiner

CARBON-BASED NEGATIVE ELECTRODE MATERIAL AND SECONDARY BATTERY INCLUDING NEGATIVE ELECTRODE MATERIAL

BACKGROUND OF THE INVENTION

1. Field of the Invention

The present invention relates to a carbon-based negative electrode material which can be used with an electrolyte containing propylene carbonate as a main ingredient and a secondary battery which contains such an electrolyte.

2. Description of the Related Art

For a negative electrode of a secondary battery, a carbon-based material such as graphite is used. Graphite has a layer structure where layers of six-membered rings each with an inter-atomic distance of about 0.14 nm are stacked at intervals of about 0.33 nm. A secondary battery is charged and discharged utilizing occlusion of lithium ions from a positive electrode into a gap between the layers.

In the case of using graphite for a negative electrode, the use of an electrolyte containing propylene carbonate (PC) as a main ingredient, which is a non-aqueous electrolyte, causes decomposition of the electrolyte and promotes separation of graphite, so that lithium ions cannot be inserted and extracted. For this reason, an electrolyte containing ethylene carbonate (EC) as a main ingredient has been used. However, EC has a low permittivity and becomes solid at room temperature. Further, when lithium salt is dissolved in EC, the viscosity increases and the ionic conductivity decreases. That is why it is difficult to use EC alone as a solvent of an electrolyte.

Thus, a technique which allows the use of an electrolyte containing PC as a main ingredient even in the case of using graphite for a negative electrode has been studied. Patent Document 1 discloses that when a coating layer containing any of an ionic conductive polymer, a water-soluble polymer, and an alkali metal compound is provided over a surface of a carbon negative electrode, propylene carbonate can be used for an electrolyte. Example 1 in Patent Document 1 discloses that a negative electrode coating including natural graphite was applied to Cu foil to form a carbon negative electrode and then a coating layer was applied to a surface of the carbon negative electrode and dried.

In Patent Document 2, description is given of, for example, insufficient control over the reactivity of a surface of a carbon negative electrode to propylene carbonate, referring to Patent Document 1 as a reference, and a technique is disclosed in which a spherical material obtained by attaching a polymer material to a spherical graphite particle as a negative electrode active material is used as a negative electrode material in combination with an electrolyte containing carbonate having an unsaturated bond and propylene carbonate.

REFERENCE

[Patent Document 1] Japanese Published Patent Application No. H11-120992
[Patent Document 2] Japanese Published Patent Application No. 2007-53022

SUMMARY OF THE INVENTION

Patent Document 1 has a problem such as insufficient control over the reactivity of the surface of the carbon negative electrode to propylene carbonate, as disclosed in Patent Document 2; thus, a coating layer needs to be further provided over the surface of the carbon negative electrode after formation of the carbon negative electrode. As for Patent Document 2, carbonate or the like having an unsaturated bond is required to be used for an electrolyte together with propylene carbonate.

In view of the above problems, in one embodiment of the present invention, a negative electrode material which can be used with an electrolyte containing propylene carbonate as a main ingredient and a secondary battery which contains such an electrolyte are provided.

A carbon-based negative electrode material having a graphene layer structure is crystalline and has pores. Further, a carbon-based negative electrode material having a graphene layer structure of one embodiment of the present invention has a large interlayer distance between graphenes. The use of such a negative electrode material permits the use of an electrolyte containing propylene carbonate as a main ingredient (an electrolyte containing PC as a main ingredient).

An electrolyte containing propylene carbonate as a main ingredient means an electrolyte containing propylene carbonate as a main solvent.

A carbon-based material having a graphene layer structure of one embodiment of the present invention is referred to as porous graphite and formed as follows.

Graphite oxide is formed with the use of graphite powder, and impurities are removed by a centrifugation method or the like. Transition metal chloride is added to the obtained graphite oxide, and the mixture was stirred with ultrasonic waves so that the transition metal chloride penetrates a gap in the graphite oxide. Next, baking is performed to reduce the graphite oxide, whereby graphite is formed. After that, the transition metal chloride is removed, so that gaps can be formed in portions of the graphite from which the chloride is removed. This graphite is porous graphite. That is to say, porous graphite has a structure in which graphites overlap with each other with a gap interposed therebetween.

In the porous graphite formed in such a manner, the interlayer distance between graphenes is larger than that in flake graphite. The porous graphite may have pores. The interlayer distance between graphenes is larger than at least the size of a solvated lithium ion generated by an electrolyte containing PC as a main ingredient and a lithium ion. In this case, solvated lithium ions do not separate graphenes in the porous graphite from each other.

Such porous graphite used as a negative electrode material of a secondary battery is particulate or membranous.

A negative electrode material of one embodiment of the present invention is a carbon-based material having a graphene layer structure, and has crystallinity. Further, the negative electrode material has pores, and the interlayer distance between graphenes is large. The use of this porous graphite as a negative electrode material allows the use of propylene carbonate for an electrolyte. Moreover, the porous graphite has a large relative surface area, leading to high occlusion efficiency of lithium ions.

DETAILED DESCRIPTION OF THE INVENTION

Hereinafter, embodiments and examples will be described with reference to drawings. However, the embodiments and examples can be implemented in various modes. It will be readily appreciated by those skilled in the art that the modes and details can be changed in various ways without departing from the spirit and scope of the present invention. Therefore, the present invention should not be construed as being limited to the following descriptions of the embodiments and examples.

Embodiment 1

A method for producing porous graphite of one embodiment of the present invention will be described.

First, graphite oxide is formed. Graphite oxide can be formed by the modified Hummers method, the Brodie method, the Staudenmaier method, or the like.

The modified Hummers method is a method by which graphite is oxidized using concentrated sulfuric acid and potassium permanganate. The Brodie method is a method by which graphite is oxidized with nitric acid and potassium chlorate. The Staudenmaier method is a method by which graphite is oxidized with nitric acid, sulfuric acid, and potassium chlorate.

An example of employing the modified Hummers method will be described below.

First, graphite powder is prepared. As the graphite, flake graphite with an average particle diameter of 1 μm to 100 μm is preferably used. Then, graphite powder is stirred into concentrated sulfuric acid, in an ice bath. Subsequently, potassium permanganate is slowly added thereto as an oxidizer and the mixture is stirred. The resulting mixture is reacted at room temperature for a long time and then reacted at a temperature slightly higher than the room temperature for a short time. Further, pure water is added thereto, followed by heating. Thus, the graphite is oxidized to form graphite oxide.

Next, a hydrogen peroxide solution is added thereto so that the oxidizer can be deactivated. The suspension obtained in this stage contains sulfate ions, manganese ions, and the like in addition to the graphite oxide. The suspension is subjected to suction filtration, whereby most of water-soluble ions are removed and a residue is collected. Then, dilute hydrochloric acid is added to the residue, and the resulting mixture is subjected to suction filtration. Accordingly, the remaining sulfate ions and manganese ions can be removed. Through the above process, the impurities are removed to give a residue of the graphite oxide.

Pure water is added to the resulting residue of the graphite oxide to yield a suspension. The obtained suspension is centrifuged to give a precipitate. The supernatant fluid is removed because it contains a large amount of hydrochloric acid.

To remove unnecessary ions and the like other than graphite oxide, it is preferable to repeat the steps from addition of pure water to centrifugation four or five times.

The resulting graphite oxide, from which unnecessary ions and the like are removed, is dried. Through the above process, graphite oxide can be produced.

Secondly, a method for forming porous graphite from graphite oxide will be described.

First, pure water is added to graphite oxide to form a suspension containing the graphite oxide.

Next, an aqueous solution of zinc chloride is added to the suspension containing the graphite oxide, and ultrasonic waves are applied to the resulting suspension while it is stirred. The application of ultrasonic waves can separate graphite oxide into thin pieces. The separation of the graphite oxide into thin pieces destroys part of the layer structure of the graphite oxide. Further, the application of ultrasonic waves can increase the dispersibility of graphite oxide and zinc chloride. Accordingly, zinc chloride penetrates gaps between the plurality of thin pieces of graphite oxide overlapping with each other. After that, this suspension is dried to yield a mixture of graphite oxide and zinc chloride.

Transition metal chloride such as cobalt chloride or nickel chloride may be used instead of the zinc chloride.

Then, the mixture of graphite oxide and zinc chloride is baked (first baking). The baking is performed, for example, in an inert atmosphere (such as a nitrogen atmosphere or a rare gas atmosphere), in a reducing atmosphere (such as a hydrogen atmosphere), or under reduced pressure, under the following conditions: the temperature is increased to 300° C. to 650° C. inclusive and the maximum temperature is kept for 1 hour to 48 hours inclusive. In this case, preferably, the rate of temperature increase is 80° C./h to 120° C./h and the temperature is decreased by spontaneous cooling. Note that the reduced pressure refers to a pressure of 10 Pa or less. Through the baking, the graphite oxide is reduced to graphite, remaining having the thin shape.

Further, the zinc chloride penetrating the gaps between the thin pieces of graphite oxide can be removed by the baking. Chlorine in the zinc chloride can be removed in such a manner that it volatilizes in the form of $Cl_2$ or HCl, and zinc is oxidized to be zinc oxide. To remove the zinc oxide, dilute hydrochloric acid is added and suction filtration is performed. After that, pure water is added to the resulting mixture and suction filtration is performed, whereby hydrochloric acid is removed. The impurities in the gaps are removed, so that porous graphite is formed. That is, the porous graphite has a structure in which graphites overlap with each other with a gap interposed therebetween.

The porous graphite is ground to give powder. This powder can be utilized for an active material.

Moreover, second baking may be performed. The maximum temperature in the second baking is preferably higher than that in the first baking. When the second baking is performed under such a condition, the crystallinity of the porous graphite can be further increased. The second baking can be performed, for example, in an inert atmosphere (such as a nitrogen atmosphere or a rare gas atmosphere), in a reducing atmosphere (such as a hydrogen atmosphere), or under reduced pressure, under the following conditions: the temperature is increased to 650° C. to 1200° C. inclusive and the maximum temperature is kept for 0.5 hours to 48 hours inclusive. Through the above process, the porous graphite can have higher crystallinity.

The porous graphite with high crystallinity is ground to give powder. This powder can be utilized for an active material.

The diameter of the particle obtained by grinding the porous graphite can be 1 µm to 50 µm inclusive.

The porous graphite formed as in this embodiment can be used as an active material of a negative electrode. In that case, it is possible to use an electrolyte containing PC as a main ingredient. Reasons why such an electrolyte containing PC as a main ingredient can be used will be described in the following embodiment.

Embodiment 2

In this embodiment, a state of porous graphite which is used as an active material of a negative electrode will be described.

Figure 1A:
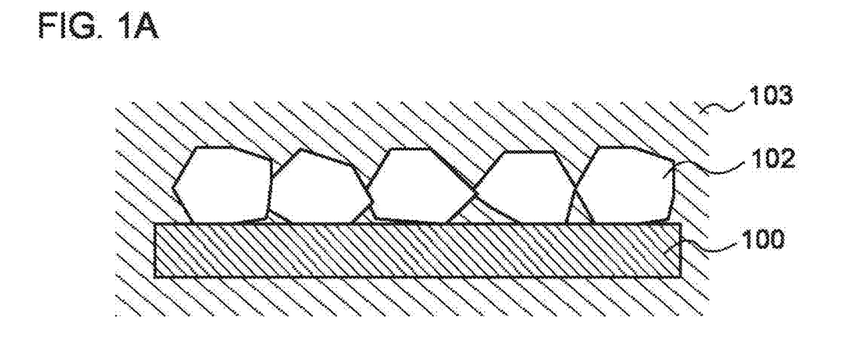
FIGS. 1A and 1B illustrate an electrode of one embodiment of the present invention.

FIG. 1A illustrates porous graphites 102 in an electrolyte 103 containing PC as a main ingredient. The porous graphites 102 are each particulate and formed as a negative electrode active material over a current collector 100, so that a negative electrode active material layer can be formed.

Figure 1B:
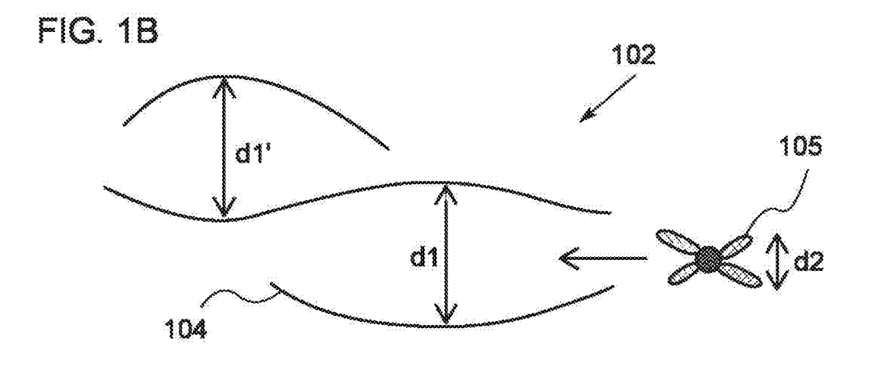

FIG. 1B is an enlarged diagram of the porous graphite 102. In the porous graphite observed microscopically, graphenes 104 overlap with each other with a certain gap interposed therebetween. The distance between the graphenes 104 stacked in the porous graphite is larger than that in flake graphite.

A lithium ion from a positive electrode becomes a solvated lithium ion 105 (the overall size is d2) in a PC solvent. When penetrating a gap between graphenes in flake graphite, solvated lithium ions may probably separate the graphenes in the flake graphene. However, in the porous graphite of one embodiment of the present invention, the distance between the graphenes 104 is so large that the graphenes 104 can be prevented from being separated from each other even when solvated lithium ions penetrate the porous graphite. In other words, since the distance between graphenes in the porous graphite (e.g., d1 and d1') is larger than the size (d2) of the solvated lithium ion 105, the graphenes 104 can be prevented from being separated from each other. Thus, the porous graphite can be used in an electrolyte containing PC as a main ingredient.

Embodiment 3

In this embodiment, a secondary battery of one embodiment will be described.

Figure 6A:
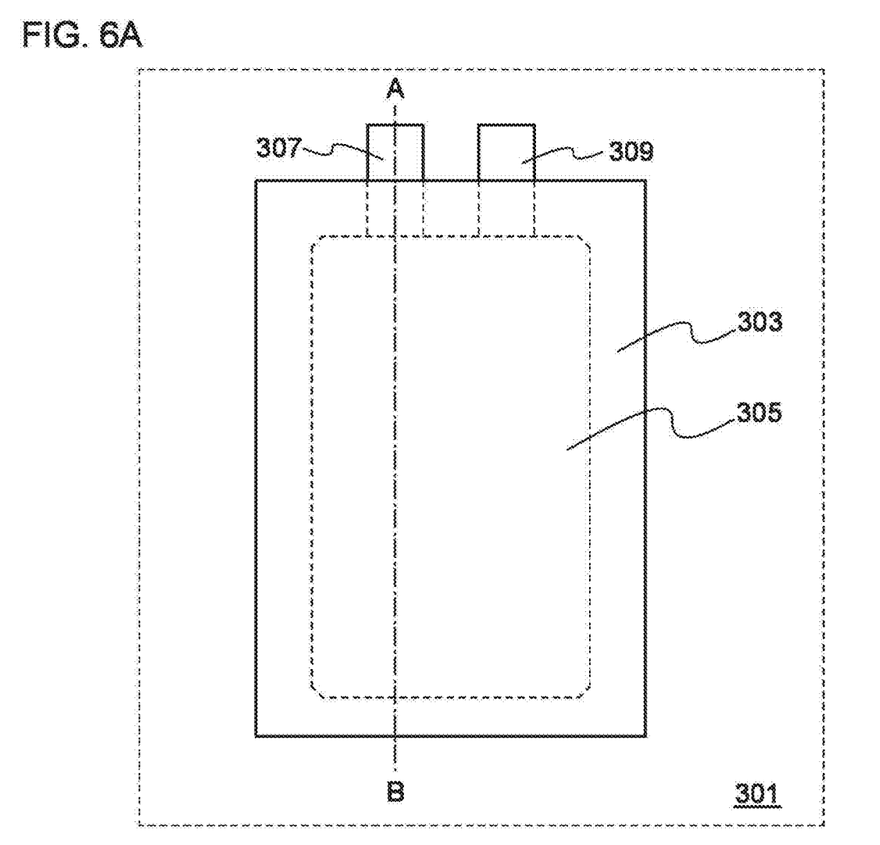
FIGS. 6A and 6B illustrate a secondary battery of one embodiment of the present invention.
Figure 6B:
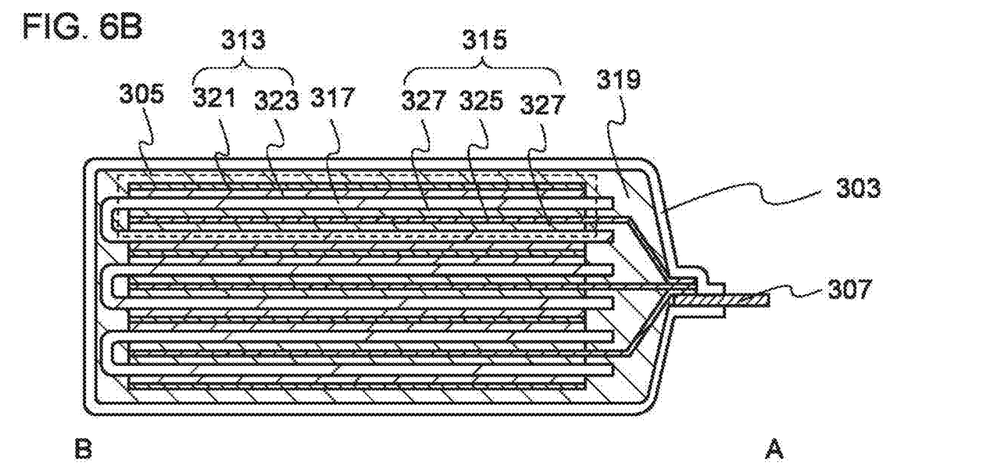

FIG. 6A is a plan view of a secondary battery 301, and FIG. 6B is a cross-sectional view along dashed dotted line A-B in FIG. 6A. The secondary battery 301 illustrated in FIG. 6A includes a power storage cell 305 in an exterior member 303. The secondary battery 301 further includes a terminal portion 307 and a terminal portion 309 which are electrically connected to the power storage cell 305. For the exterior member 303, a laminate film, a polymer film, a metal film, a metal case, a plastic case, or the like can be used.

As illustrated in FIG. 6B, the power storage cell 305 includes a negative electrode 313, a positive electrode 315, a separator 317, and an electrolyte 319. The separator 317 is provided between the negative electrode 313 and the positive electrode 315. A portion almost surrounded with the exterior member 303 is filled with the electrolyte 319, and the power storage cell 305 is immersed in the electrolyte 319.

The negative electrode 313 is formed according to any of the above embodiments and includes at least a negative electrode current collector 321 and a negative electrode active material layer 323. The positive electrode 315 includes at least a positive electrode current collector 325 and a positive electrode active material layer 327. The negative electrode active material layer 323 can be formed on one surface or opposite surfaces of the negative electrode current collector 321. That is, a negative electrode material including porous graphite may be provided on one surface or opposite surfaces of the negative electrode current collector 321. The positive electrode active material layer 327 be formed on one surface or opposite surfaces of the positive electrode current collector 325.

The negative electrode current collector 321 is electrically connected to the terminal portion 309. The positive electrode current collector 325 is electrically connected to the terminal portion 307. Further, the terminal portions 307 and 309 each partly extend outside the exterior member 303.

Note that although a sealed thin secondary battery is described as the secondary battery 301 in this embodiment, the external shape of the secondary battery 301 is not limited thereto and can be any of a variety of shapes such as a button shape, a cylindrical shape, or a rectangular shape. Further, although the structure where the positive electrode, the negative electrode, and the separator are stacked is described in this embodiment, a structure where the positive electrode, the negative electrode, and the separator are rolled may be employed.

As a material of the positive electrode current collector 325, aluminum, stainless steel, or the like is used. The shape of the positive electrode current collector 325 can be a foil shape, a plate shape, a net shape, or the like.

The positive electrode active material layer 327 can be formed using any of $LiFeO_2$, $LiCoO_2$, $LiNiO_2$, $LiMn_2O_4$, $LiFePO_4$, $LiCoPO_4$, $LiNiPO_4$, $LiMnPO_4$, $V_2O_5$, $Cr_2O_5$, $MnO_2$, and other lithium compounds as an active material. Note that when carrier ions are alkali metal ions other than lithium ions, alkaline earth metal ions, beryllium ions, or magnesium ions, the positive electrode active material layer 327 can be formed using, instead of lithium in the above lithium compounds, an alkali metal (e.g., sodium or potassium), an alkaline earth metal (e.g., calcium, strontium, or barium), beryllium, or magnesium.

As a solute of the electrolyte 319, a material containing lithium ions, i.e., carrier ions, is used. Examples of the solute of the electrolyte 319 include lithium salts such as $LiClO_4$, $LiAsF_6$, $LiBF_4$, $LiPF_6$, and $Li(C_2F_5SO_2)_2N$. Note that when carrier ions are alkaline earth metal ions or alkali metal ions other than lithium ions, alkali metal salt (e.g., sodium salt or potassium salt), alkaline earth metal salt (e.g., calcium salt, strontium salt or barium salt), beryllium salt, magnesium salt, or the like can be used as the solute of the electrolyte 319.

As the solvent of the electrolyte 319, a non-aqueous solvent containing propylene carbonate as a main ingredient can be used. Further, a gelled solvent may be used as the solvent of the electrolyte 319. When a gelled solvent is used, safety against liquid leakage and the like is improved and the secondary battery 301 can be thin and lightweight.

As the separator 317, an insulating porous material is used. Examples of the separator 317 include cellulose (paper), polyethylene, and polypropylene.

When a negative electrode material including porous graphite of one embodiment of the present invention is used for the negative electrode, an electrolyte containing PC as a main ingredient can be used. A secondary battery which includes a negative electrode material including porous graphite of one embodiment of the present invention is also referred to as a power storage device because of its function of storing power.

Embodiment 4

In this embodiment, a secondary battery of another embodiment will be described.

Figure 7:
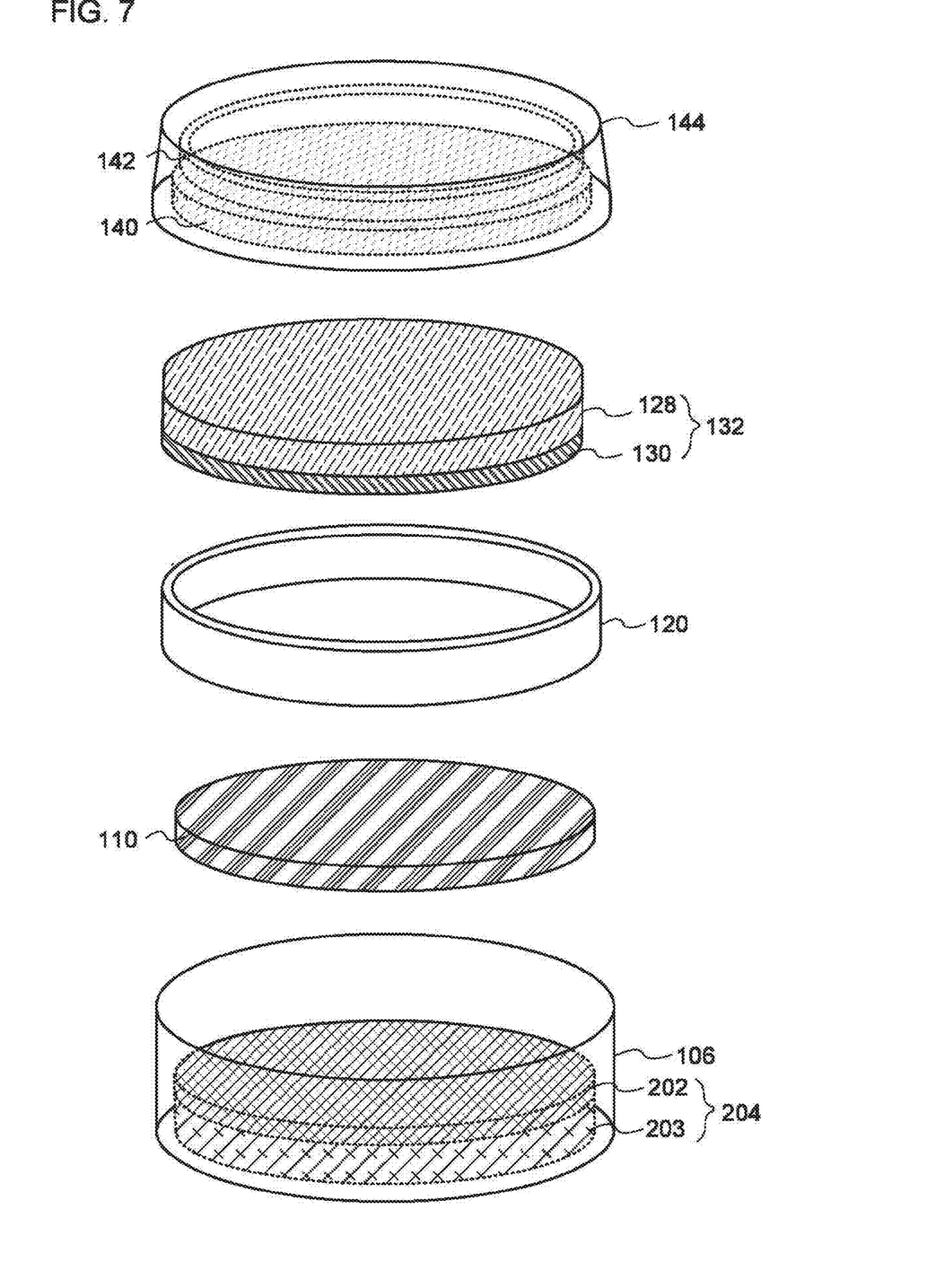
FIG. 7 illustrates a secondary battery of one embodiment of the present invention.

FIG. 7 is a schematic diagram of the structure of a coin secondary battery. The coin secondary battery includes a negative electrode 204, a positive electrode 132, a separator 110, an electrolyte (not illustrated), a housing 106, and a housing 144. Besides, the coin secondary battery includes a ring-shaped insulator 120, a spacer 140, and a washer 142.

The negative electrode 204 includes a negative electrode current collector 202 and a negative electrode active material layer 203. The negative electrode active material layer 203 is formed according to any of the above embodiments. As the negative electrode current collector 202, copper or titanium is used.

The positive electrode 132 includes a positive electrode current collector 128 and a positive electrode active material layer 130. As a material for the positive electrode current collector 128, aluminum is preferably used. The positive electrode active material layer 130 is formed according to the above embodiment.

As a solvent of the electrolyte, a material containing PC as a main ingredient, and for a solute thereof, the above embodiment can be referred to.

For the separator 110, the above embodiment can also be referred to.

The housing 106, the housing 144, the spacer 140, and the washer 142 each of which is made of a metal (e.g., stainless steel) are preferably used. The housing 106 and the housing 144 have a function of electrically connecting the negative electrode 204 and the positive electrode 132 to an external unit.

The negative electrode 204, the positive electrode 132, and the separator 110 are immersed in the electrolyte. Then, as illustrated in FIG. 7, the negative electrode 204, the separator 110, the ring-shaped insulator 120, the positive electrode 132, the spacer 140, the washer 142, and the housing 144 are stacked in this order with the housing 106 positioned at the bottom, and the housing 106 and the housing 144 are subjected to pressure bonding. In such a manner, the coin secondary battery is fabricated.

When porous graphite of one embodiment of the present invention is used for the negative electrode, an electrolyte containing PC as a main ingredient can be used. A secondary battery like the coin secondary battery is also referred to as a power storage device because of its function of storing power.

Embodiment 5

The secondary battery of one embodiment of the present invention can be used for power supplies of a variety of electric appliances which can be operated with power.

Specific examples of electric appliances each utilizing the secondary battery of one embodiment of the present invention are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and dialyzers. In addition, moving objects driven by electric motors using power from secondary batteries are also included in the category of electric appliances. Examples of the moving objects include electric vehicles, hybrid vehicles each including both an internal-combustion engine and an electric motor, and motorized bicycles including motor-assisted bicycles.

In the electric appliances, the secondary battery of one embodiment of the present invention can be used as a secondary battery for supplying enough power for almost the whole power consumption (referred to as a main power supply). Alternatively, in the electric appliances, the secondary battery of one embodiment of the present invention can be used as a secondary battery which can supply power to the electric appliances when the supply of power from the main power supply or a commercial power supply is stopped (such a secondary battery is referred to as an uninterruptible power supply). Still alternatively, in the electric appliances, the secondary battery of one embodiment of the present invention can be used as a secondary battery for supplying power to the electric appliances at the same time as the power supply from the main power supply or a commercial power supply (such a secondary battery is referred to as an auxiliary power supply).

Figure 8:
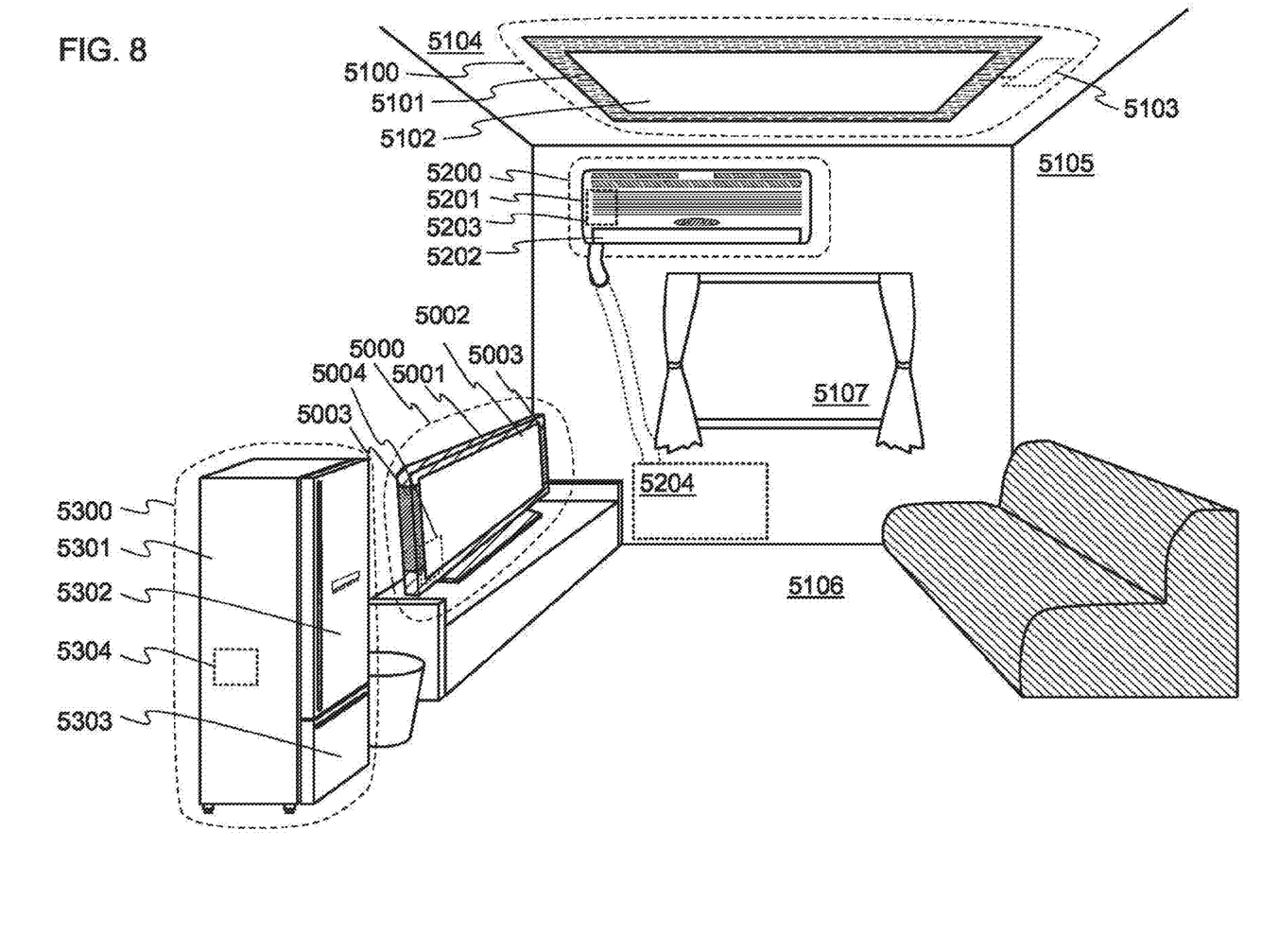
FIG. 8 illustrates products each equipped with a secondary battery of one embodiment of the present invention.

FIG. 8 illustrates specific structures of the electric appliances. In FIG. 8, a display device 5000 is an example of an electric appliance including a secondary battery 5004 of one embodiment of the present invention. Specifically, the display device 5000 corresponds to a display device for TV broadcast reception and includes a housing 5001, a display portion 5002, speaker portions 5003, and the secondary battery 5004. The secondary battery 5004 of one embodiment of the present invention is provided in the housing 5001. The display device 5000 can receive power from a commercial power supply. Alternatively, the display device 5000 can use power stored in the secondary battery 5004. Thus, the display device 5000 can be operated with the use of the secondary battery 5004 of one embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 5002.

Note that the display device includes, in its category, all of information display devices for personal computers, advertisement displays, and the like besides TV broadcast reception.

In FIG. 8, an installation lighting device 5100 is an example of an electric appliance including a secondary battery 5103 of one embodiment of the present invention. Specifically, the lighting device 5100 includes a housing 5101, a light source 5102, and a secondary battery 5103. Although FIG. 8 illustrates the case where the secondary battery 5103 is provided in a ceiling 5104 on which the housing 5101 and the light source 5102 are installed, the secondary battery 5103 may be provided in the housing 5101. The lighting device 5100 can receive power from a commercial power supply. Alternatively, the lighting device 5100 can use power stored in the secondary battery 5103. Thus, the lighting device 5100 can be operated with the use of the secondary battery 5103 of one embodiment of the present invention as an uninterruptible power supply even when power cannot be supplied from a commercial power supply due to power failure or the like.

Note that although the installation lighting device 5100 provided in the ceiling 5104 is illustrated in FIG. 8 as an example, the secondary battery of one embodiment of the present invention can be used in an installation lighting device provided in, for example, a wall 5105, a floor 5106, a window 5107, or the like other than the ceiling 5104. Alternatively, the secondary battery can be used in a tabletop lighting device or the like.

As the light source 5102, an artificial light source which emits light artificially by using power can be used. Specifically, discharge lamps such as an incandescent lamp and a fluorescent lamp, and light-emitting elements such as an LED and an organic EL element are given as examples of the artificial light source.

In FIG. 8, an air conditioner including an indoor unit 5200 and an outdoor unit 5204 is an example of an electric appliance including a secondary battery 5203 of one embodiment of the invention. Specifically, the indoor unit 5200 includes a housing 5201, an air outlet 5202, and a secondary battery 5203. Although FIG. 8 illustrates the case where the secondary battery 5203 is provided in the indoor unit 5200, the secondary battery 5203 may be provided in the outdoor unit 5204. Alternatively, the secondary batteries 5203 may be provided in both the indoor unit 5200 and the outdoor unit 5204. The air conditioner can receive power from a commercial power supply. Alternatively, the air conditioner can use power stored in the secondary battery 5203. Particularly in the case where the secondary batteries 5203 are provided in both the indoor unit 5200 and the outdoor unit 5204, the air conditioner can be operated with the use of the secondary battery 5203 of one embodiment of the present invention as an uninterruptible power supply even when power cannot be supplied from a commercial power supply due to power failure or the like.

Note that although the split-type air conditioner including the indoor unit and the outdoor unit is illustrated in FIG. 8 as an example, the secondary battery of one embodiment of the present invention can be used in an air conditioner in which the functions of an indoor unit and an outdoor unit are integrated in one housing.

In FIG. 8, an electric refrigerator-freezer 5300 is an example of an electric appliance including a secondary battery 5304 of one embodiment of the present invention. Specifically, the electric refrigerator-freezer 5300 includes a housing 5301, a door for a refrigerator 5302, a door for a freezer 5303, and the secondary battery 5304. The secondary battery 5304 is provided in the housing 5301 in FIG. 8. The electric refrigerator-freezer 5300 can receive power from a commercial power supply. Alternatively, the electric refrigerator-freezer 5300 can use power stored in the secondary battery 5304. Thus, the electric refrigerator-freezer 5300 can be operated with the use of the secondary battery 5304 of one embodiment of the present invention as an uninterruptible power supply even when power cannot be supplied from a commercial power supply due to power failure or the like.

Note that among the electric appliances described above, a high-frequency heating apparatus such as a microwave oven and an electric appliance such as an electric rice cooker require high power in a short time. The tripping of a breaker of a commercial power supply in use of an electric appliance can be prevented by using the secondary battery of one embodiment of the present invention as an auxiliary power supply for supplying power which cannot be supplied enough by a commercial power supply.

In addition, in a time period when electric appliances are not used, particularly when the proportion of the amount of power which is actually used to the total amount of power which can be supplied from a commercial power supply source (such a proportion referred to as a usage rate of power) is low, power can be stored in the secondary battery, whereby the usage rate of power can be reduced in a time period when the electric appliances are used. For example, in the case of the electric refrigerator-freezer 5300, power can be stored in the secondary battery 5304 in night time when the temperature is low and the door for a refrigerator 5302 and the door for a freezer 5303 are not often opened or closed. On the other hand, in daytime when the temperature is high and the door for a refrigerator 5302 and the door for a freezer 5303 are frequently opened and closed, the secondary battery 5304 is used as an auxiliary power supply; thus, the usage rate of power in daytime can be reduced.

Example 1

In this example, a method for forming porous graphite will be described.

After 116 mL of concentrated sulfuric acid was put in a 1000-mL conical flask, 2 g of graphite powder (flake graphite) was added thereto, followed by stirring in an ice bath. Then, 12 g (0.076 mol) of potassium permanganate was slowly added to this suspension and the mixture is stirred. The resulting mixture was reacted at room temperature for two hours and then reacted at 35° C. for thirty minutes. After that, pure water was added thereto, followed by heating at about 98° C. for fifteen minutes. Further, 36 mL of 30 wt % hydrogen peroxide solution was added thereto and the resulting suspension was filtrated to give a residue.

Dilute hydrochloric acid was added to the residue, and filtration was performed. Then, dilute hydrochloric acid was added to the obtained residue, followed by filtration. After washing, pure water was added to the resulting residue, centrifugation was performed at 3000 rpm for 30 minutes, and then the supernatant fluid was removed. Steps in which pure water was further added to the precipitate, centrifugation was performed, and the supernatant fluid was removed were repeated several times. After removing the supernatant fluid, drying was performed to give a reddish brown solid that is graphite oxide.

Pure water was added to 1.5 g of reddish brown solid, and a zinc chloride solution where 2 g of zinc chloride was dissolved in 300 mL of pure water was mixed into the obtained mixture. After ultrasonic waves were applied to the suspension while it was stirred, the resulting suspension was dried to give the mixture.

The mixture was put in an alumina boat and first baking was performed in such a manner that the mixture was heated in a nitrogen atmosphere under the following conditions: the temperature was increased at a rate of 100° C./h until it reached 650° C. and the maximum temperature was kept for 1 hour. Consequently, a gray sintered body was obtained. Dilute hydrochloric acid was added to the sintered body, pure water was added thereto, washing was performed, and then filtration was performed. Steps in which pure water was added to the residue to wash it and filtration was performed were repeated several times. The resulting residue was dried and then ball milled.

Further, second baking was performed on gray powder obtained by the milling, in a nitrogen atmosphere under the following conditions: the temperature was increased at a rate of 300° C./h until it reached 1200° C. and the maximum temperature was kept for 1 hour. Through the above process, porous graphite powder was yielded.

Figure 2:
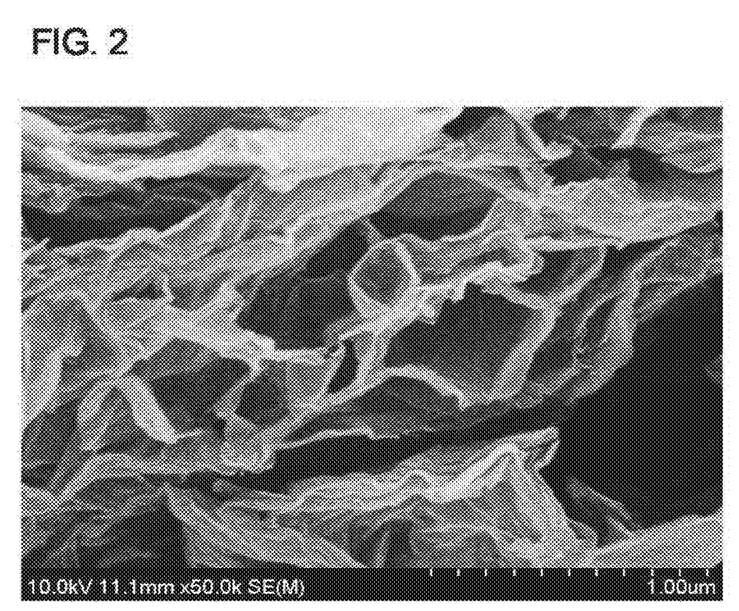
FIG. 2 shows porous graphite of one embodiment of the present invention.
Figure 3:
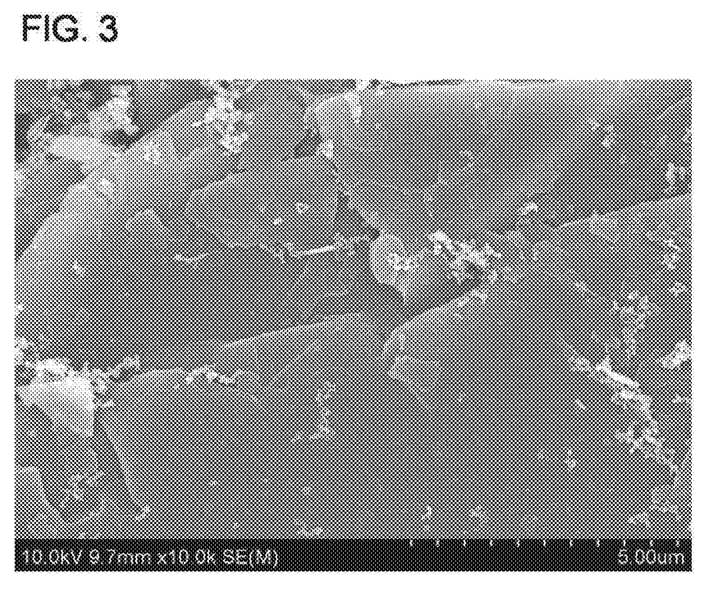
FIG. 3 shows flake graphite of a comparative example.

FIG. 2 shows the porous graphite observed with a scanning electron microscope (SEM). FIG. 3 is a SEM image of flake graphite as a comparative example.

As is clear from comparison between FIG. 2 and FIG. 3, the porous graphite of this example has gaps. In other words, the plurality of graphites overlap with each other with a gap interposed therebetween.

Porous graphite having such a structure can be used as an active material of a negative electrode.

Example 2

In this example, an X-ray diffraction (XRD) measurement result of porous graphite will be described.

Figure 9:
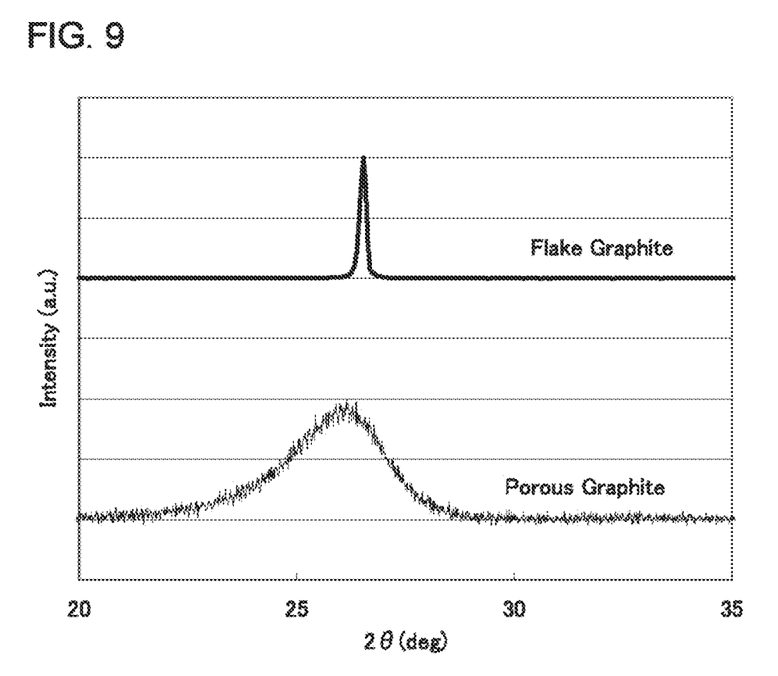
FIG. 9 is a graph showing XRD measurement results of porous graphite of one embodiment of the present invention and flake graphite of a comparative example.

FIG. 9 shows XRD measurement results of porous graphite and flake graphite. The XRD spectrum of porous graphite has a peak, which indicates that the porous graphite has crystallinity. The peak of the XRD spectrum of the porous graphite is at around a point of $2\theta=26.4$ (degrees) similarly to that of flake graphite, which suggests that the porous graphite has the crystal structure similar to that of the flake graphite.

The results show that the half-width of the peak of the XRD spectrum of the porous graphite is wider than that of the flake graphite, which indicates the porous graphite has lower crystallinity than the flake graphite. Specifically, in the porous graphite, the layered structure of graphenes is distorted more significantly than that in the flake graphite. The interlayer distance between the graphenes included in the flake graphite and the interlayer distance between the graphenes included in the porous graphite were calculated from the half-widths to be 0.336 nm and 0.340 nm, respectively. Thus, the results show that the interlayer distance of the porous graphite is wider than the interlayer distance of the flake graphite.

Porous graphite having such an interlayer distance can be used as an active material of a negative electrode. When such porous graphite is used, a secondary battery that contains an electrolyte containing PC as a main ingredient can be manufactured.

Example 3

In this example, the diameter and volume of a pore in porous graphite were measured and the relative surface area was examined. For the measurement, a micromeritics automatic surface area and porosimetry analyzer (Tristar 113020 manufactured by Shimadzu Corporation) was used. The micromeritics automatic surface area and porosimetry analyzer is measuring equipment for measuring the relative surface area of a sample based on the amount of gas molecules whose area occupied for adsorption can be determined and which are adsorbed to a surface of a particle of the sample. The pore distribution was calculated by Barrett-Joyner-Halenda (BJH) method by which the pore size is found from a desorption isotherm showing the relation between the relative pressure and the adsorption amount at the time when adsorbents are desorbed.

Figure 10:
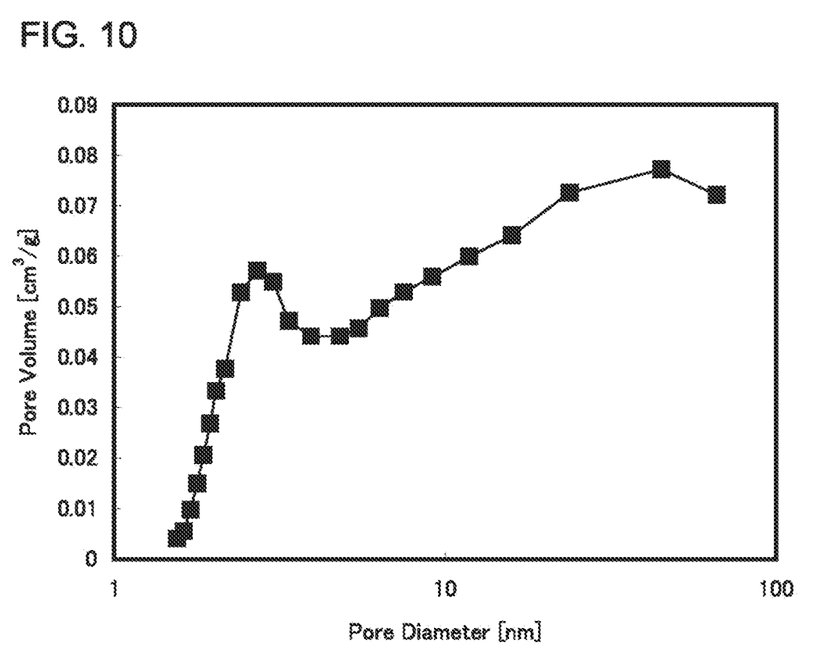
FIG. 10 is a graph showing distribution measurement results of pores in porous graphite of one embodiment of the present invention.

FIG. 10 shows the result of the porous graphite. The result shows that the smallest pore diameter of the pore diameters of the porous graphite is 1.5 nm and a peak thereof is around 3 nm. There is no pore with a diameter of less than 1.5 nm, presumably because baking was performed two times at high temperatures in formation of the porous graphite.

According to the result, as the pore diameter reaches the peak, the pore volume increases, which indicates that the relative surface area also increases. Specifically, the result shows that there are many pores with diameters ranging from 2 nm to 4 nm, which increases the relative surface area.

The use of a material having a large relative surface area for a negative electrode increases occlusion efficiency of lithium ions.

Example 4

In this example, changes in capacity with respect to voltage was measured (cycle test was performed) using a negative electrode including porous graphite and an electrolyte containing PC as a main ingredient.

<Method for Forming Negative Electrode Including Porous Graphite>

Acetylene black and PVdF were used as a conductive additive and a binder, respectively, and porous graphite, acetylene black, and PVdF were mixed at a composition ratio of 75:5:20 to form slurry. The slurry was applied to Cu foil and dried at 70° C. for 20 minutes. After that, drying was further performed at 170° C. in vacuum for 10 hours.

<Other Materials>

For a positive electrode, Li was used, and a PC solvent into which 1 mol of $LiPF_6$ was mixed was used as an electrolyte. As a separator, polypropylene (PP) was used.

<Conditions of Cycle Test>

The conditions for discharge were as follows: the discharge was performed at constant current (CC) and constant voltage (CV); the lower voltage limit was 0.005 V; the current value was equivalent to 0.2 C; and the discharge was stopped when the current value became equivalent to 0.016 C. The conditions for charge were as follows: the charge was performed at CC; the upper voltage limit was 2.5 V; the current value was equivalent to 0.2 C; and the charge was stopped when the voltage reached 2.5 V.

Figure 4:
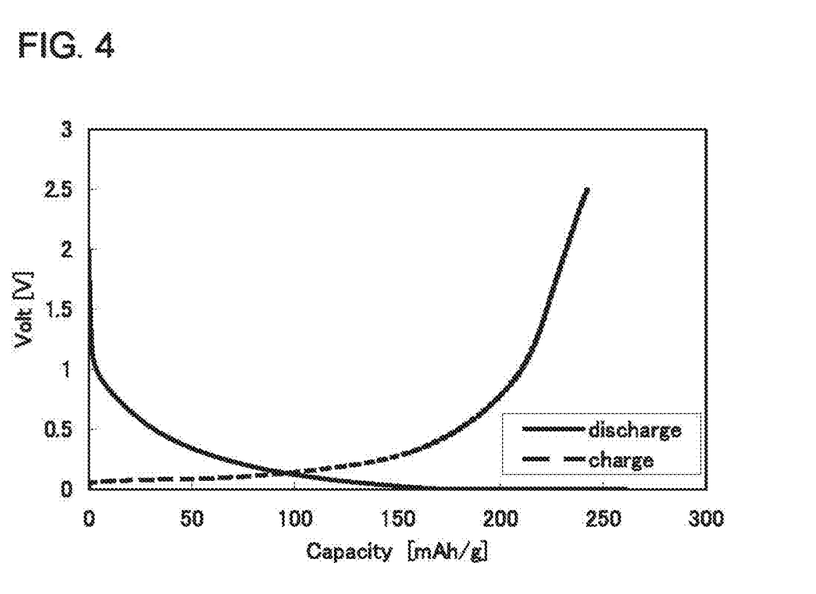
FIG. 4 is a graph showing CV characteristics of a battery including porous graphite of one embodiment of the present invention.

FIG. 4 shows CV results of discharge and charge in the second cycle. In FIG. 4, the vertical axis represents voltage (volt [V]) in discharging/charging, and the horizontal axis represents capacity ([mAh/g]).

Figure 5:
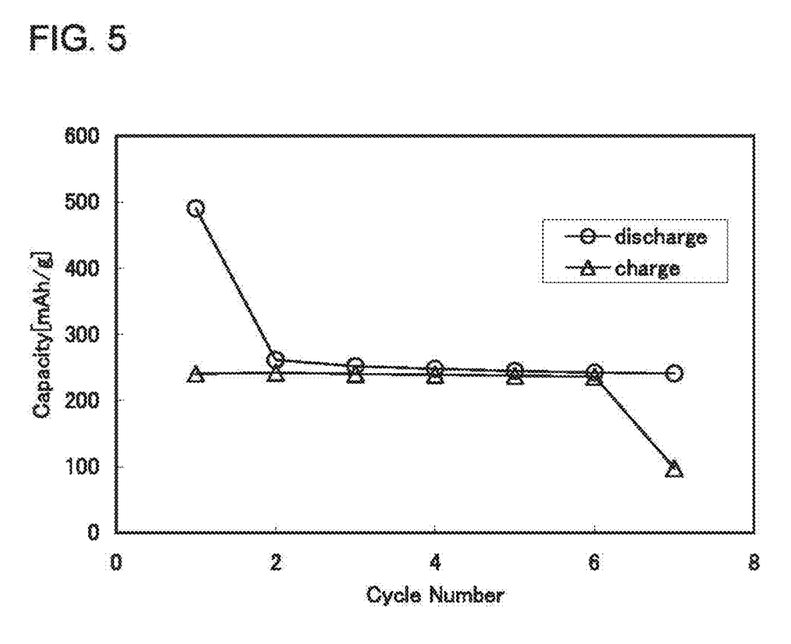
FIG. 5 is a graph showing cycle characteristics of a battery including porous graphite of one embodiment of the present invention.

FIG. 5 shows results of cycle tests repeated seven times. In FIG. 5, the vertical axis represents capacity ([mAh/g]) in discharging/charging, and the horizontal axis represents the cycle number.

The above results reveal that it is possible to use an electrolyte containing PC as a main ingredient. Because PC is stable at room temperature or lower, battery properties can be prevented from being degraded at a low temperature.

This application is based on Japanese Patent Application Serial No. 2011-188920 filed with the Japan Patent Office on Aug. 31, 2011, the entire contents of which are hereby incorporated by reference.

What is claimed is:

1. A secondary battery comprising:
   a negative electrode including a carbon-based material having a graphene layer structure; and
   an electrolyte,
   wherein the solvent of the electrolyte consists essentially of propylene carbonate, and
   wherein the carbon-based material has crystallinity and pores.

2. The secondary battery according to claim 1, wherein diameters of the pores of the carbon-based material range from 2 nm to 4 nm.

3. A secondary battery comprising:
   a negative electrode including a carbon-based material having a graphene layer structure; and
   an electrolyte,
   wherein the solvent of the electrolyte consists essentially of propylene carbonate,
   wherein the carbon-based material has crystallinity and pores, and
   wherein an interlayer distance between graphenes is larger than a size of a solvated lithium ion generated by the electrolyte and a lithium ion.

4. The secondary battery according to claim 3, wherein diameters of the pores of the carbon-based material range from 2 nm to 4 nm.

5. The secondary battery according to claim 3, wherein the interlayer distance between graphenes is larger than an interlayer distance of a flake graphite.

6. The secondary battery according to claim 1, wherein the electrolyte consists essentially of propylene carbonate and lithium salt.

7. The secondary battery according to claim 3, wherein the electrolyte consists essentially of propylene carbonate and lithium salt.

8. The secondary battery according to claim 1, wherein the carbon-based material is porous graphite.

9. The secondary battery according to claim 3, wherein the carbon-based material is porous graphite.

10. An electric appliance comprising the secondary battery according to claim 1.

11. An electric appliance comprising the secondary battery according to claim 3.

* * * * *